R. J. GRIESEDIECK.
HOOD ATTACHMENT FOR AUTOMOBILES.
APPLICATION FILED DEC. 22, 1919.
1,403,768.
Patented Jan. 17, 1922.
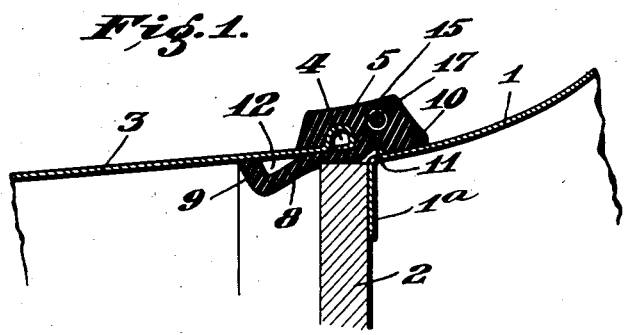
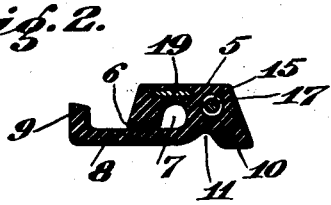
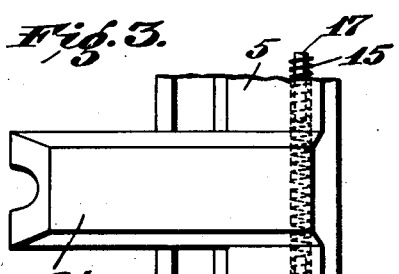
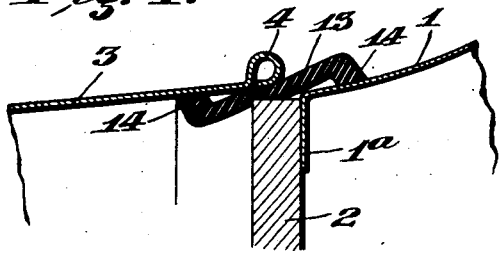
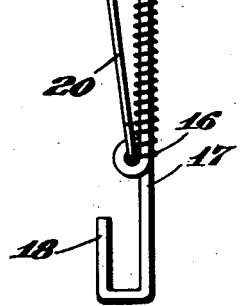
Inventor:
Robert J. Griesedieck,
By George A. Pennington
his Atty.

UNITED STATES PATENT OFFICE.

ROBERT J. GRIESEDIECK, OF ST. LOUIS, MISSOURI.

HOOD ATTACHMENT FOR AUTOMOBILES.

1,403,768.  Specification of Letters Patent.  Patented Jan. 17, 1922.

Application filed December 22, 1919. Serial No. 346,515.

*To all whom it may concern:*

Be it known that I, ROBERT J. GRIESEDIECK, a citizen of the United States, residing in the city of St. Louis, and State of Missouri, have invented a new and useful Improvement in Hood Attachments for Automobiles, of which the following is a specification.

This invention relates to automobiles and has more particularly to do with the weather-proofing of the joint between the hood, cowl and dash or foot-board, so as to prevent water, due to rain or otherwise, from entering under the hood and between the cowl and dash and short-circuiting or interfering with the operation of the electrical devices usually carried on the dash or foot-board.

The present invention comprehends certain modifications of that set forth in my pending application for Letters Patent, Serial No. 339,635, filed November 21, 1919, and it consists in a novel construction and arrangement of a weather-strip and in its application to the hood, cowl and dash as hereinafter described and set forth in the appended claims.

In the accompanying drawing illustrating practical embodiments of the invention, Figure 1 is a fragmentary section of the hood, cowl and dash or foot-board of an automobile, showing a weather-strip applied according to the invention;

Figure 2 is a section of the strip in normal, detached condition;

Figure 3 is a fragmentary top plan view of the middle and one end portion of the strip detached;

Figure 4 is a view similar to Figure 1, showing a modification of the strip; and Figure 5 is a section of the strip shown in Figure 4, but in normal, detached condition.

Referring now more particularly to Figures 1 to 3, inclusive, of the drawing, the numeral 1 designates the cowl of the automobile body whose forward edge portion 1ª is turned downward and abuts the rear side of the dash or foot-board 2, while the numeral 3 designates the hood which covers the engine and parts in front of the dash and whose rear marginal portion closes about the edge of the dash near the cowl. The rear marginal portion of the hood, as shown, is formed with a bead 4, but in certain other structures the bead may not occur. The present invention, however, is applicable in either case and it is not limited to any one make of car, although it is more particularly intended for Ford cars whose hood and cowl structures are ineffective in shedding water from the dash or foot-board during a heavy rain fall.

The weather-strip of the present invention is preferably made of rubber or some suitable flexible and resilient waterproof material. The normal cross section of the preferred form of the strip is shown in Figure 2 of the drawing. Extending longitudinally in one side of the body portion 5 of the strip is a slit 6 which communicates with an enlargement or throat 7 about the middle of the strip. A portion of the strip is extended outward from the slit, as at 8, and is provided at its margin with an upturned flange or lip 9. At the opposite side of the strip is a rib 10 which is formed by grooving the under side of the strip, as at 11.

The strip thus formed is readily slipped onto the marginal portion of the hood (see Figure 1), the bead 4 of the latter being received in the enlargement or throat 7, while the material in the region of the slit 6 engages the outer and inner faces of the hood. The extension 8, with its lip 9 engaging the under side of the hood, is sprung so that the lip 9 is pressed in close contact throughout against the hood and a space 12 is afforded by the gutter thus formed. In this way the strip is held in place on the hood and there is but little liability of water getting in around the bead 4. However, should any water seep in under the hood it would be only slight and be conducted off in the gutter afforded by the portions 8 and 9 of the strip, so as not to come in contact with the coils or instruments on the dash or foot-board.

When the hood is closed the portion of the strip under the immediate edge portion of the hood is clamped on the dash, while the marginal rib 10 of the strip bears throughout upon the adjacent face of the cowl, whereby water is prevented from getting in under the strip.

In Figures 4 and 5 of the drawing, a modification of the strip is shown. In this form the middle portion of the strip is generally flat throughout, as at 13, and at the margins are oppositely extended flanges or lips 14; or, in other words, the strip is substantially Z-shape in cross section. In some cases this form of strip will serve the purpose well, but the form shown in Figures 1 to 3, inclusive, is more desirable and advantageous.

In either case, by having a part of the strip underlie the hood and the other part overlie the cowl, and with the oppositely extending marginal flanges or lips respectively pressed in contact with the hood and cowl, an effective seal is attained so as to keep out the water as above set forth.

As shown in Figures 1 to 3, inclusive, a spring 15 is extended through the strip lengthwise and attached at its ends, as at 16, to an eye or loop in rods 17 which are slidable in the spring and extend to near the middle of the strip. These rods, which are pliable so as to conform to the contour of the hood and cowl, have their outer end portions rebent to afford hooks 18 to engage in the opposite ends of the hollow bead 4 of the hood. It is also preferable to provide a suitable connection between the ends of the strip and the respective rods 17. As shown, a plate 19 is anchored in the end portion of the strip and a link 20 has one end hooked or looped through an aperture in the plate and its opposite end likewise secured to the eye in the rod 17. In this way the strip may be stretched slightly when the hooked ends 18 of the rods are engaged in the bead 4; and the spring 15 being also stretched, sufficient tension is always maintained to hold the strip in contact with the cowl and at the same time it is supported so as to be movable with the hood when the latter is opened or closed.

The strip shown in Figures 4 and 5 may be merely laid in place and the hood brought in contact therewith to hold it effectively in use, or, if desired, it may be nailed at intervals throughout its length to the dash or be otherwise secured in place.

At the middle of the strip a lateral offset or projection 21 may be provided to cover the usual hinge joint of the two hood sections, and this projection may be of any desired length.

The strip of the present invention is easily applied and does not interfere with the opening and closing of the hood, and when the hood is closed it is effective in preventing water from reaching the electrical coils and appliances on the dash as hereinbefore set forth.

Obviously, the structure admits of considerable modification without departing from the spirit of the invention, and it is, therefore, not limited to that shown in the drawing.

What is claimed is:

1. The combination of the hood, cowl and dash of an automobile, and a weather-strip having a middle portion clamped by the hood, a marginal portion underlying the hood and another marginal portion overlying the cowl, said marginal portions being under compression in contact with said hood and cowl, respectively.

2. The combination of the hood, cowl and dash of an automobile, and a weather-strip having one side portion underlying the hood and the opposite side portion overlying the cowl, the extreme marginal portions of said strip being flanged and engaging respectively the hood and cowl under pressure.

3. A weather-strip for the purpose described, the body portion of said strip being slitted longitudinally on one side for the reception of the marginal portion of the hood, the marginal portion of the strip underlying the hood being flanged and engaging the latter with sealing effect, and the opposite side portion of the strip having a marginal flange engaging the cowl with sealing effect.

4. An elastic weather-strip for the purpose described, the same having oppositely extended marginal flanges to respectively engage the under side of the hood and the outer face of the cowl adjacent to the dash, whereby, when the middle portion of said strip is clamped, the said marginal flanges are under compression.

5. An elastic weather-strip of the character described, pliable rods slidable longitudinally in said strip, the meeting ends of said rods terminating near the middle of the strip and the outer end portions being capable of attachment to the hood, a spring extending longitudinally through said strip and attached at its ends to said rods, and the ends of said strip being connected to said rods.

6. The combination of the hood, cowl and dash of an automobile, and a resilient weather-strip, the middle longitudinal portion of said strip being clamped between the marginal portion of the hood and the edge of the dash, one side portion of said strip underlying the hood and having a marginal flange engaging the hood, the opposite side portion of the strip overlying the adjacent outer face of the cowl and having a marginal flange engaging the cowl.

ROBT. J. GRIESEDIECK.